United States Patent [19]

Adachi

[11] 4,427,149
[45] Jan. 24, 1984

[54] BI-METALLIC STEAM TRAP

[75] Inventor: Rai R. Adachi, Scarborough, Canada

[73] Assignee: Erwel Inc., Toronto, Canada

[21] Appl. No.: 321,283

[22] Filed: Nov. 13, 1981

[51] Int. Cl.³ ............................................... F16T 1/08
[52] U.S. Cl. .................................... 236/59; 236/101 B
[58] Field of Search ..................... 236/59, 93 R, 101 B

[56] References Cited

U.S. PATENT DOCUMENTS

| | | | |
|---|---|---|---|
| 3,226,026 | 12/1965 | Domm et al. | 236/59 |
| 3,353,746 | 11/1967 | Foller | 236/59 |
| 3,985,296 | 10/1976 | Fujiwara | 236/59 |
| 4,026,464 | 5/1977 | Doherty, Jr. | 236/101 B X |
| 4,320,871 | 3/1982 | Kuroda et al. | 236/59 |
| 4,327,863 | 5/1982 | Foller | 236/59 |

*Primary Examiner*—William E. Tapolcai
*Attorney, Agent, or Firm*—Arne I. Fors; Robert F. Delbridge

[57] ABSTRACT

A steam trap having a thermostatically controlled bimetallic valve for discharging condensate from steam lines is disclosed. The steam trap has a housing having a fluid inlet port, a fluid outlet port, and valve means within said housing between the inlet port and the outlet port comprising a valve adapted to seat on a valve seat for controlling fluid flow through said steam trap from said inlet port to said outlet port and a bimetallic assembly responsive to temperature variations for controlling the opening and closing of said valve means. The bimetallic assembly comprises at least one primary bimetallic member mounted within said housing operably connected to said valve stem to open and close the valve on the valve seat and at least one secondary bimetallic member adapted to be supported within the housing in opposition to said primary bimetallic member, said secondary bimetallic member arranged such that said primary bimetallic member can expand during initial heating thereof without interference from the secondary bimetallic member but continued expansion of said primary bimetallic member is opposed by said secondary bimetallic member as the temperature of the fluid increases.

12 Claims, 11 Drawing Figures

BI-METALLIC STEAM TRAP

This invention relates to a steam trap and, more particularly, relates to a thermostatically controlled bimetallic valve for a steam trap adapted to discharge condensation water from a steam line.

Thermostatically controlled valves for controllably discharging condensate from steam lines are well known. Steam traps which make use of stacked bimetallic elements of the creep type for the control of the movement of a valve into and out of sealing engagement with a valve seat wherein, for example, a column of superimposed bimetallic elements are arranged in opposed pairs which curve in opposite directions during increase of temperature to expand and contract as the temperatures of the fluid flowing into and through the valve varies to actuate the valve, are typified in U.S. Pat. No. 3,362,636. It is desirable that the arrangement of bimetallic elements provides a thermostatic force on the valve members which increases with temperature and pressure in a continuous manner which parallels the saturated steam curve. Many bimetallic constructions provide thermostatically controlled opening and closing functions represented by a series of connected straight lines which approximate the parabolic line of the saturated steam curve. The structures of the foregoing patent incorporate spring biasing means to counterbalance the movement of the bimetallic column to approach the saturated steam curve.

Canadian Pat. No. 598,815 discloses a bimetallic construction incorporating a pair of sets of metallic strips which cooperate to approximate the characteristics of the saturated steam curve for opening and closing a steam valve.

U.S. Pat. No. 3,226,026 shows another version of thermostatically controlled valve for a steam trap in which a spring member is used in conjunction with a column of bimetallic plates whereby the spring member is flexed to an increasing extent during heat expansion of the column such that the opposite points of contact of the spring member and the column members contacted change so that the stiffness of the spring member increases during rise of the temperature of the fluid flowing to a valve seat.

It is a principal object of the present invention to provide an improved thermostatically controlled bimetallic valve for actuation of a steam trap in which bimetallic elements are arranged in a novel manner to provide thermostatic opening and closing of the valve on a valve seat at temperatures and pressures which lie within a parabolic curve range which closely approximates the saturated steam curve.

The construction of the steam trap of the present invention comprises, in general, a housing having a fluid inlet port, a fluid outlet port, and valve means within said housing between the inlet port and the outlet port comprising a valve adapted to seat on a valve seat for controlling fluid flow through said steam trap from said inlet port to said outlet port, a bimetallic assembly responsive to temperature variations for controlling the opening and closing of said valve means, said bimetallic assembly comprising at least one primary bimetallic member mounted within said housing operably connected to said valve stem to open and close the valve on the valve seat, and at least one secondary bimetallic member adapted to be supported within the housing in opposition to said primary bimetallic member, said secondary bimetallic member arranged such that said primary bimetallic member can expand during initial heating thereof without interference from the secondary bimetallic member but continued expansion of said primary bimetallic member is opposed by said secondary bimetallic member as the temperature of the fluid increases.

More particularly, said at least one primary bimetallic member preferably compises a plurality of stacked bimetallic members mounted within said housing operably connected to said valve stem to open and close the valve on the valve seat, and said secondary bimetallic member preferably comprises at least one bimetallic member adapted to be loosely supported in proximity to an end of said stacked bimetallic members, said secondary bimetallic member arranged such that said secondary bimetallic member changes configuration from a substantially planar configuration to an arcuate or dished configuration with the outer or convex side thereof facing the primary stacked bimetallic members, whereby said primary stacked bimetallic members can expand during initial heating thereof without interference with the secondary bimetallic member but continued expansion of said primary stacked bimetallic members is opposed by said secondary bimetallic member as the temperature of the fluid increases.

The first plurality of stacked bimetallic members can be discs mounted within the housing co-axial with the valve stem and the secondary bimetallic member can be a plurality of discs axially aligned with the said first plurality of stacked bimetallic members or a cantilever bimetallic member adapted to engage and oppose movement of the valve stem.

The primary plurality of stacked bimetallic members comprises a plurality of pairs of opposed bimetallic members wherein the bimetallic members of each pair assume a substantially planar position at low temperatures and assume a concavoconvex configuration at higher temperatures for abutment of the marginal edge portions of opposed members with axial separation of the centres of said members away from or towards each other, with accumulative increase or decrease of the length of a stack of said bimetallic members when heated or cooled.

The steam trap housing preferably comprises a body adapted to contain the inlet port and the outlet port and an integral or a removable valve seat threaded into a passage substantially perpendicular to the axes of the inlet and outlet ports and interconnecting said ports. The primary plurality of stacked bimetallic members and the valve stem are enclosed by a cap having a cylindrical chamber formed therein concentric with the said stacked bimetallic members and in which the stacked bimetallic members can slidably travel in axial alignment with the valve stem and valve seat.

In a preferred embodiment of my invention, a secondary plurality of axially aligned bimetallic members can be secured together by a rivet or the like securing means at their common axis.

The secondary plurality of axially aligned bimetallic members may be loosely secured in axial alignment with the stacked bimetallic members in an inner portion of the cap cylindrical cavity by means of a retainer clip.

The cap cylindrical chamber perferably has a plurality of equi-spaced recesses extending lengthwise of the chamber from the juncture of the cap with the body to a point adjacent the location of the secondary plurality of bimetallic members whereby enhanced fluid circulation is provided about the stacked bimetallic members for good heat transfer from the fluid to the said stacked members with restricted circulation about the secondary bimetallic members.

The objects of the invention and the manner in which they can be attained will become apparent from the following detailed description of the accompanying drawings, in which.

With reference to the drawings, the embodiment of the present invention shown in FIGS. 1-6 comprises a main body or housing 10 having an inlet port 12, an outlet port 14, and a cap 16. A thermostatically controlled bimetallic assembly comprising a plurality 18 of bimetallic members opens and closes a central flow passage 20 in valve seat housing 22 which is positioned in passageway 23 between inlet port 12 and outlet port 14 perpendicular thereto. Housing 22 comprises a valve seat 24 which is adapted to receive in sealing engagement valve 26.

Figure 1:
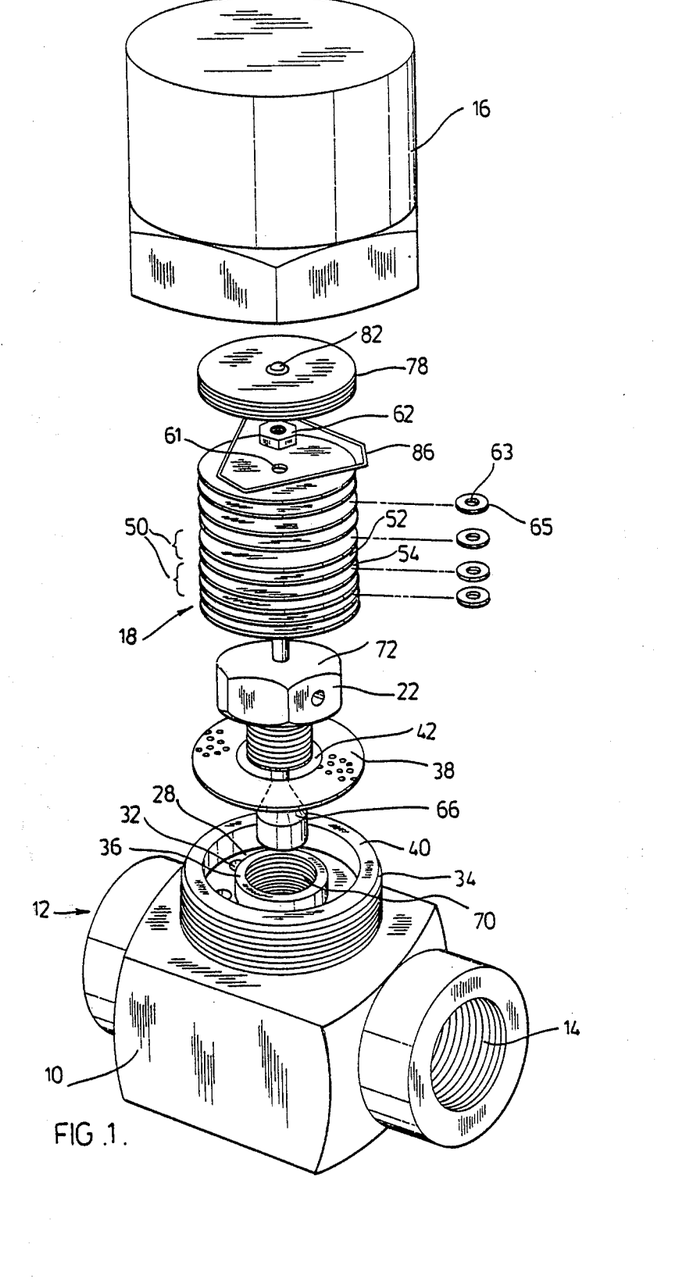
FIG. 1 is an exploded perspective view of a steam trap of the present invention showing the components axially separated.
Figure 2:
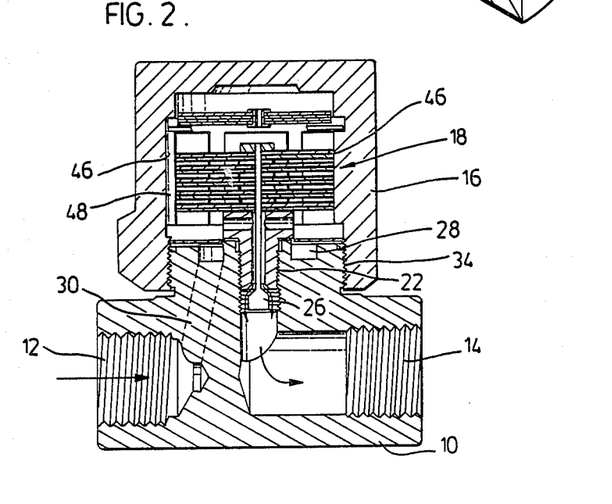
FIG. 2 is a longitudinal section of the steam trap of the invention showing the stacked bimetallic members in a retracted position for flow of fluid through the valve.

Inlet port 12 at one end of housing 10 is communicated with annular recess 28 by means of one or more vertically inclined passageways 30 terminating at port or ports 32 for the ingress of fluid through inlet port 12 to the interior of cap 16 which is preferably threaded onto cylindrical wall 34 which, together with upraised annular projection 36 concentric therewith, define annular recess 28.

A circular screen 38 adapted to seat on the upper surface 40 of cylindrical wall 34 has central opening 42 adapted to receive annular projection 36 which preferably extends slightly above the plane of upper wall surface 40 to ensure centering of screen 38 therewith.

Figure 4:
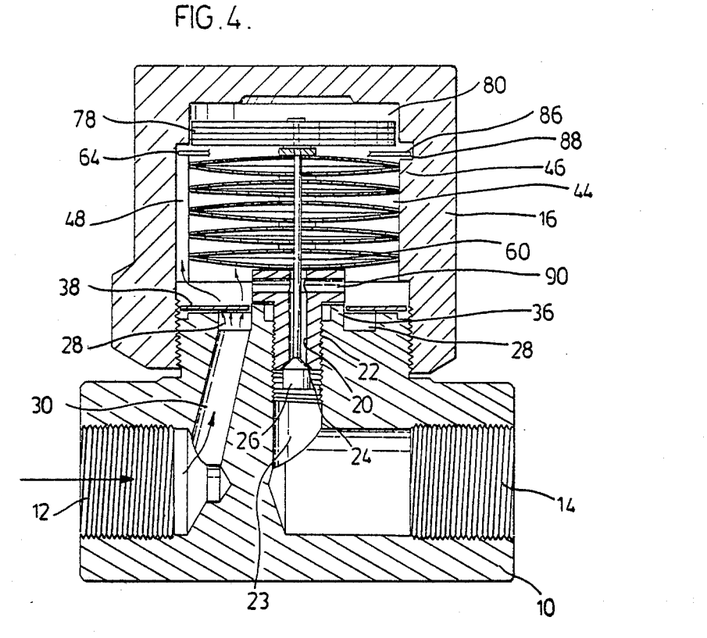
FIG. 4 is a longitudinal section of the steam trap of the invention in a state of actuation corresponding to FIG. 3.

Bimetallic component 18 is concentrically aligned with the cylindrical cavity 44 of cap 16 by means of a plurality of equispaced longitudinally extending ribs 46 which define longitudinally extending recesses 48 therebetween to permit the flow of fluid from annular recess 28 to the interior cap 16, as more clearly viewed in FIG. 4. Bimetallic component 18 comprises a plurality of annularly shaped opposed pairs 50 of bimetallic members or discs 52,54 arranged in a stacked configuration whereby the opposed discs 52,54 change from a substantially planar configuration when cool to a concavoconvex or dished shape when heated with the discs 52,54 of each pair disposed with the concave sides facing each other whereby the marginal edges of the discs abut and the centres extend away from each other when heated.

The pairs 50 of discs are stacked on the stem 60 of valve 26 by passage of stem 60 through a central longitudinal opening formed in the bimetallic component by central openings 61,63 formed in the discs and spacing washers 65 respectively and are secured thereto by means of a nut 62 threaded onto the free end 64 of stem 60. The opposite end of stem 60 passes through central passageway 20 formed in valve seat housing 22 such that the tapered surface 66 of the valve is adapted to move towards and away from valve seat 24 for fluid-sealing engagement therewith. Valve seat housing 22 is threaded into the interior of central passageway 23 formed in housing 10 with the enlarged head 72 adapted to seat tightly on the upper surface 40 of annular projection 36. Central passage 20 intersected by radial passages 90 in valve housing 22 is in communication with the interior chamber 44 of cap 16.

Figure 3:
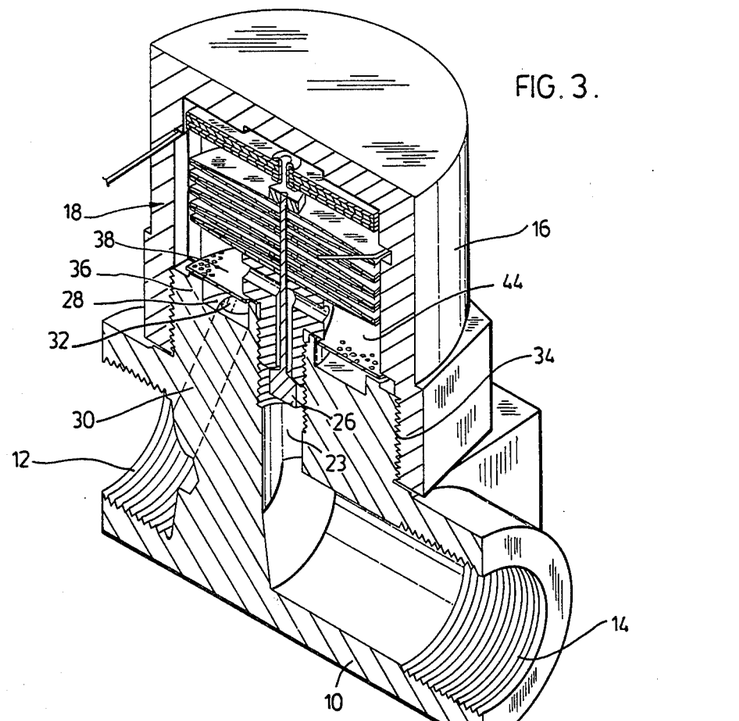
FIG. 3 is a longitudinal cutaway of an assembled valve showing the component parts in an initial stage of heating of the stacked bimetallic members.
Figure 5:
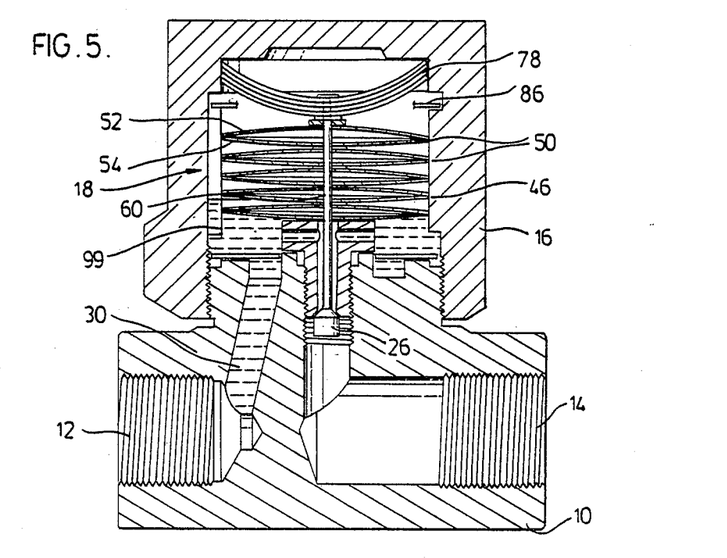
FIG. 5 is a longitudinal section of the steam trap showing the actuation of the bimetallic elements in the upper inner portion of the valve assembly opposing the extension of the valve stem.

Nut 62 is axially adjusted on stem 60 such that a desired clearance is obtained between valve 26 and valve seat 24 when the bimetallic component is in its normal contracted position while permitting the valve 26 to close passage 20 upon abutment of valve body 26 on valve seat 24 as the bimetallic component 18 expands when heated as viewed in FIGS. 3, 4 and 5.

The inner opposed sides of bimetallic members 52,54 of each pair 50 has a coefficient of thermal expansion which is less than the coefficient of thermal expansion of the outer sides thereof such that the discs will assume a planar or flat configuration when cooled or at a low temperature and will assume the concavo-convex or inwardly dished configuration when heated to a higher temperature, the degree of deformation being a function of the temperature increase.

A secondary component of bimetalic discs 78 comprising one or more discs stacked coaxially with each other such that the discs will assume a common concavo-convex configuration with the convex side facing the bimetallic component 18 upon heating of said discs is disposed within cylindrical chamber extension 80 formed in the innermost portion of cap 16 coaxial with chamber 44 such that discs 78 are disposed concentric and aligned with the discs of stack component 18. Discs 78 may be joined together by means of a central rivet 82 for convenience of assembly and the discs preferably are loosely supported within chamber 80 by means of retainer clip 86 which is resiliently expanded into annular recess 88.

In operation, line pressure from steam entering the stea trap by means of inlet port 12 and passages 30 forces valve 26 away from seat 24 to an open position for escape of fluid by means of radial passages 90, central passage 20 and outlet port 14. The admission of steam to chamber 44 results in an increase in temperature which causes the bimetallic component 18 to expand and draw valve 28 into sealing engagement with valve seat 24. As condensate collects in chamber 44 and surrounds bimetallic members 50 and 54, the temperature of the primary bimetallic members is lowered and, when the temperature reaches a predetermined lower level as indicated on the graph of FIG. 6, the primary bimetallic members have flattened to the degree that valve stem 60 extends and the pressure within chamber 44 forces valve 26 away from valve seat 24 to permit the egress of condensate therethrough, as depicted in FIG. 3.

Figure 6:
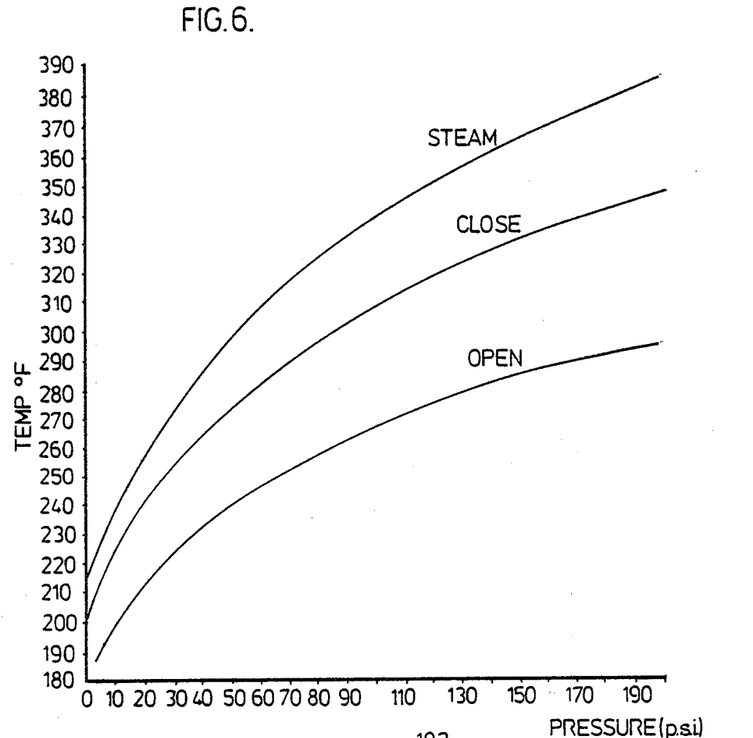
FIG. 6 is a graph of temperature versus pressure showing the saturated steam curve relative to actuation of the valve assembly of the present invention shown in FIGS. 1-6.

The secondary plurality of bimetallic discs 78 in the innermost chamber 80 of cap 16 assumes the configuration shown in FIG. 5 to oppose the expansion of bimetallic component 18 in the higher temperature ranges whereby the opening and closing curves as shown in FIG. 6 parallel the saturated steam curve to provide a substantially constant temperature differential with respect to the steam curve.

The plurality of equispaced recesses 48 permit the passage of fluid, steam or condensate, from annular recess 28 into the interior of cap 16 for effective heat transfer to disc stack 18, i.e. the primary plurality of bimetallic members. Chamber extension 80 does not have recesses 48 and thus circulation of fluid about discs 78, i.e. the secondary plurality of bimetallic members, is restricted.

Disc stack 18 accordingly is more sensitive to temperature changes than discs 78, as indicated in FIGS. 3 and 4, in lower temperature ranges where the moderating effect of discs 78 of the bimetallic assembly is not desired. At higher temperature ranges, as depicted in FIG. 5, discs 78 are actuated to oppose the extension of stem 60 under the bias of disc stack 18, and thus the two components of the bimetallic assembly cooperate to control the opening and closing of the valve.

Condensate 99 which collects in annular space 28 and in the lower portion of cap 16 (FIG. 5), cools discs stack 18 permitting the stack to contract, particularly at higher temperatures under the urging of discs 78, to open valve 26 relative to valve seat 24 and allow the condensate to drain through outlet 14.

A continuously increasing thermostatic force is exerted on the valve 26 during cooling to allow, for example, opening of the valve at a pressure within the range of 0–1500 kPa when the condensate temperature drops to about 30–45 Celsius degrees below the steam temperature and closing of the valve at about 5–20 Celsius degrees below the steam temperature.

Figure 7:
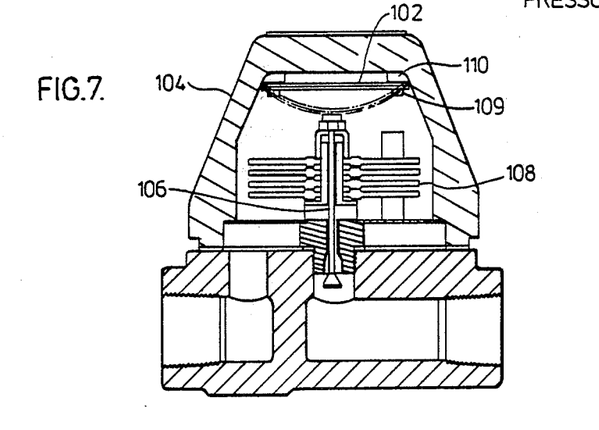
FIG. 7 is a longitudinal section of another embodiment of the invention.

The embodiment of my invention shown in FIG. 7 comprises a secondary bimetallic member 102 positioned within cap 104 co-axial with steam stem 106 which is actuated by primary bimetallic stack 108. Bimetallic member 102 is held in place by screw 109 secured to ring 110, member 102 being shown in its normal low temperature position spaced from stem 106 by solid lines and in its actuated high temperature position opposing closing axial movement of stem 106 by ghost lines.

Figure 8:
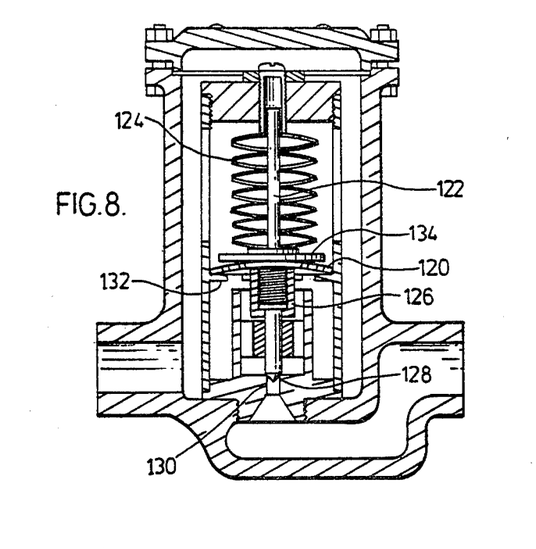
FIG. 8 is a longitudinal section of a further embodiment of the invention.

FIG. 8 shows another embodiment of my invention in which secondary bimetallic member 120 is mounted concentric with valve stem 122 between primary disc stack 124 and valve seat housing 126. In this embodiment, valve 128 is normally retracted upstream from valve seat 130 and is actuated into fluid-sealing engagement therewith by expansion of disc stack 124. Member 120 normally is in a planar configuration and assumes a concavo-convex shape upon heating, as depicted in the Figure, to oppose the extension of primary disc stack 18 and axial movement of stem 122. The periphery of member 120 seats on annular ledge 132 and the central portion of member 120 abuts washer 134.

Figure 9:
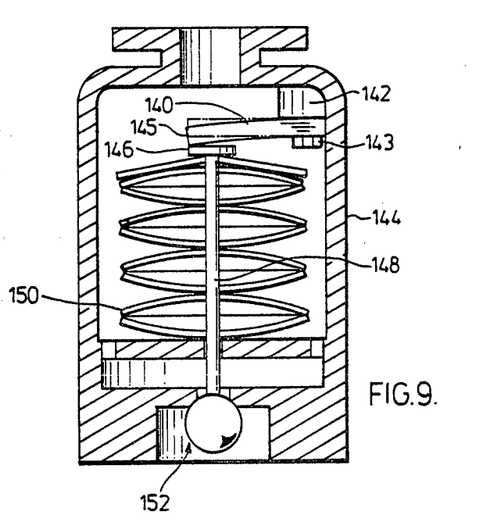
FIG. 9 is a transverse section of a cantilever embodiment of my invention.

The embodiment shown in FIG. 9 comprises a secondary cantilever bimetallic member 140 secured to ledge 142 formed within cap 144 by bolt 143 such that the free end 145 is engaged by nut 146 secured to the end of valve stem 148 as primary disc stack 150 expands to close valve 152. Valve 152 when cool is retracted to an open position by primary disc stack 150 and valve stem 148 with nut 146 is spaced from member 144, as indicated by the ghost lines. The heating of secondary member 140 causes a downward deflection of said member, as viewed in FIG. 9, to oppose the extension of valve stem 148 at high temperatures.

Figure 10:
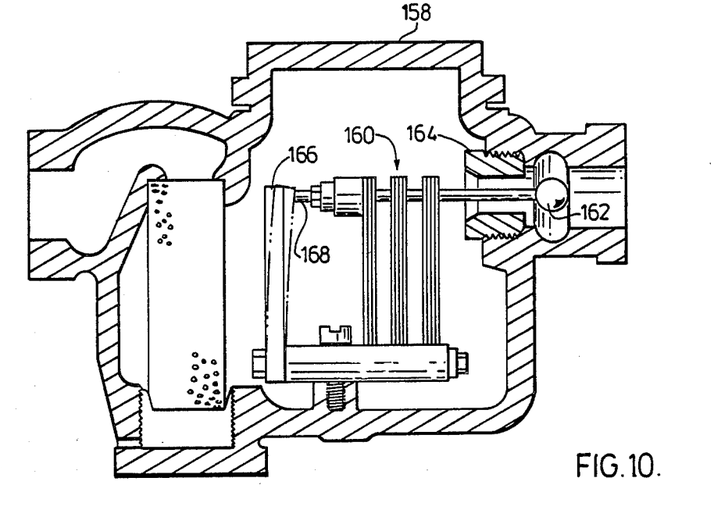
FIG. 10 is a longitudinal section of another cantilever embodiment of my invention.

FIG. 10 illustrates an embodiment of steam trap 158 having three packets 160 of primary bimetallic cantilevers which sequentially close downstream valve 162 on valve seat 164 against steam pressure as the temperature increases. Secondary bimetallic cantilever 166 is spaced from the valve stem 168 when the valve is open, as shown by solid lines, and opposes the closing force of the bimetallic packets 160, as depicted in ghost lines, as the temperature increases. Bimetallic cantilever member 166 thus changes configuration from a substantially planar shape to an arcuate shape opposing the bias of the packets 160.

Figure 11:
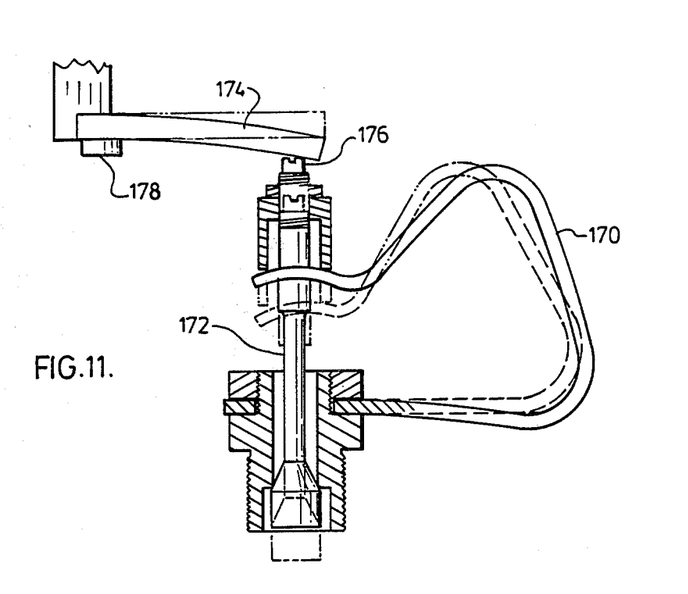
FIG. 11 is a longitudinal section of a further embodiment of the invention.

The embodiment illustrated in FIG. 11 comprises a primary delta-shaped bimetallic member 170 secured to valve stem 172 to provide axial movement of the valve stem 172 upon unequal contraction and expansion of the bimetal alloys. Secondary bimetallic cantilever 174, secured by bolt 178, is spaced from the adjusting screw extension 176 of stem 172 at low temperatures and is adapted to oppose the axial movement of stem 172 at higher temperatures as the valve is closed, as shown by ghost lines.

The bimetallic members described may be circular discs, as depicted in the embodiment illustrated in FIGS. 1–6, or square, rectangular, hexagonal, elipsoidal or the like. A single or a plurality of bimetallic members may be used, depending on the actuating control forces desired.

The steam trap of the present invention permits opening and closing of the valve at temperatures below the steam temperature to minimize or preclude live steam losses to the atmosphere. The steam trap has particular utility in tracing water lines to avoid freeze-up in cold environments where live steam losses can be significant.

It will be understood that modifications can be made in the embodiment of the invention illustrated and described herein without departing from the scope and purview of the invention as defined by the appended claims.

What I claim as new and desire to protect by Letters Patent of the United States is:

1. A steam trap comprising, in combination, a housing having a fluid inlet port, a fluid outlet port, and valve means within said housing between the inlet port and the outlet port comprising a valve having a valve stem adapted to seat on a valve seat for controlling fluid flow through said steam trap from said inlet port to said outlet port, a bimetallic assembly responsive to temperature variations for controlling the opening and closing of said valve means, said bimetallic assembly comprising at least one primary bimetallic member mounted within said housing operably connected to said valve stem to open and close the valve on the valve seat, and at least one secondary bimetallic member adapted to be supported within the housing in opposition to closing of the valve on the valve seat by said primary bimetallic member, said secondary bimetallic member arranged such that said primary bimetallic member expands during initial heating thereof without interference from the secondary bimetallic member but continued expansion of said primary bimetallic member and closing of the valve on the valve seat are opposed by said secondary bimetallic member whereby closing of the valve on the valve seat by the primary bimetallic member is resisted as the temperature of the fluid increases.

2. A steam trap comprising, in combination, a housing having a fluid inlet port, a fluid outlet port, and valve means within said housing between the inlet port and the outlet port comprising a valve having a valve stem adapted to seat on a valve seat for controlling fluid flow through said steam trap from said inlet port to said outlet port, a bimetallic assembly responsive to temperature variations for controlling the opening and closing of said valve means, said bimetallic assembly comprising a primary plurality of stacked bimetallic members mounted within said housing operably connected to said valve stem to open and close the valve on the valve seat, and at least one secondary bimetallic member adapted to be loosely supported in proximity to an end of said primary stacked bimetallic members, said secondary bimetallic member arranged such that said secondary bimetallic member changes configuration from a substantially planar configuration to an arcuate configuration to abut and oppose opening of the valve stem, whereby said primary stacked bimetallic members expand during initial heating thereof without interference from the secondary bimetallic member but continued expansion of said primary stacked bimetallic members and closing of the valve on the valve seat are opposed by said secondary bimetallic member whereby closing of the valve on the valve seat by the primary bimetallic member is resisted as the temperature of the fluid increases.

3. A steam trap as claimed in claim 2 wherein said at least one secondary bimetallic member comprises a plurality of bimetallic discs axially aligned with the primary plurality of stacked bimetallic members at an end of the primary stacked members remote from the valve, said secondary plurality of bimetallic members arranged such that said bimetallic members change configuration from a substantially planar configuration to a concavo-convex configuration with the convex side thereof facing the primary stacked bimetallic members.

4. A steam trap as claimed in claim 3 wherein said housing has a cap removably secured thereto, said cap having a cylindrical cavity adapted to receive the primary stacked bimetallic members in slidable travel therein.

5. A steam trap as claimed in claim 4 wherein the primary stacked bimetallic members are circular discs and the cap cylindrical cavity is concentric with the primary stacked discs and the valve stem whereby the valve stem is maintained in axial alignment with the valve seat during actuation of the valve stem by the bimetallic assembly.

6. A steam trap as claimed in claim 5 wherein the cap cylindrical cavity has a plurality of longitudinal slots extending the length of the primary stacked discs for enhanced circulation of fluid to the said primary stacked discs for good heat transfer from the fluid thereto and fluid circulation about the secondary plurality of bimetallic members is restricted, whereby the primary stacked discs are more sensitive to temperature change than the secondary plurality of bimetallic discs.

7. A steam trap as claimed in claim 2 wherein said housing has a cap removably secured thereto, said cap having a cylindrical cavity adapted to receive the primary stacked bimetallic members in slidable travel therein, said cylindrical cavity being concentric with the primary stacked discs and the valve stem whereby the valve stem is maintained in axial alignment with the valve seat during actuation of the valve stem by the bimetallic assembly, and wherein the cap cylindrical cavity has a plurality of longitudinal slots extending the length of the primary stacked discs for enhanced circulation of fluid to the said primary stacked discs for good heat transfer from the fluid thereto and restricted fluid circulation about the secondary bimetallic member.

8. A steam trap as claimed in claim 2 wherein the at least one secondary bimetallic member is seated concentric with and straddling the valve stem at an end of the primary plurality of stacked bimetallic members adjacent the valve seat.

9. A steam trap as claimed in claim 2 wherein the at least one secondary bimetallic member is rigidly secured in proximity to but spaced from an end of the primary stacked bimetallic members and the valve stem.

10. A steam trap as claimed in claim 9 wherein said secondary bimetallic member is a cantilever bimetallic member adapted to bend against the valve stem or extension thereof at elevated temperatures.

11. A steam trap as claimed in claim 1 wherein said at least one primary bimetallic member comprises a plurality of packets of bimetallic cantilevers which sequentially actuate and close to valve stem and said secondary bimetallic member is a cantilever bimetallic member rigidly secured in proximity to but spaced from the valve stem.

12. A steam trap as claimed in claim 1 wherein said at least one primary bimetallic member comprises a delta-shaped bimetallic member and said secondary bimetallic member is a cantilever bimetallic member rigidly secured in proximity to but spaced from the valve stem.

* * * * *